US011314535B2

(12) United States Patent
Gambetta et al.

(10) Patent No.: US 11,314,535 B2
(45) Date of Patent: Apr. 26, 2022

(54) QUANTUM DATA RESULT STREAMING

(71) Applicant: INTERNATIONAL BUSINESS MACHINES CORPORATION, Armonk, NY (US)

(72) Inventors: Jay M. Gambetta, Yorktown Heights, NY (US); Ismael Faro Serfage, Chappaqua, NY (US); David C. Mckay, Ossining, NY (US); Francisco J. Martin Fernandez, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 16/449,253

(22) Filed: Jun. 21, 2019

(65) Prior Publication Data

US 2020/0401427 A1    Dec. 24, 2020

(51) Int. Cl.
*G06F 9/54* (2006.01)
*G06F 9/455* (2018.01)
*G06N 10/00* (2022.01)

(52) U.S. Cl.
CPC .............. *G06F 9/455* (2013.01); *G06F 9/546* (2013.01); *G06N 10/00* (2019.01)

(58) Field of Classification Search
CPC ...... G06F 9/4843; G06F 9/52; G06F 17/5022; G06F 17/5036
USPC ................................ 718/100; 703/13, 21, 22
See application file for complete search history.

(56) References Cited

U.S. PATENT DOCUMENTS

| 8,244,650 | B2 | 8/2012 | Rose |
| 9,881,256 | B2 | 1/2018 | Hamze et al. |
| 10,031,887 | B2 | 7/2018 | Raymond |
| 2017/0223143 | A1 | 8/2017 | Johnson et al. |
| 2018/0046933 | A1* | 2/2018 | La Cour ................ G06N 10/00 |
| 2019/0042392 | A1 | 2/2019 | Matsuura et al. |
| 2019/0042677 | A1* | 2/2019 | Matsuura ................ G06F 30/20 |
| 2019/0180197 | A1* | 6/2019 | Granade ................ G06N 7/005 |
| 2020/0117764 | A1* | 4/2020 | Zuccarelli .............. G06N 10/00 |
| 2020/0327269 | A1* | 10/2020 | Pond ...................... G06N 10/00 |

FOREIGN PATENT DOCUMENTS

| CN | 108647790 A | 10/2018 |
| CN | 109063843 A | 12/2018 |
| CN | 109213603 A | 1/2019 |

* cited by examiner

*Primary Examiner* — Andy Ho
(74) *Attorney, Agent, or Firm* — Henry J. Daley; Venable LLP

(57) ABSTRACT

A quantum computer system for streaming data results, the quantum computer system configured to: receive a first job request from a requesting entity, the first job request comprising instructions to execute a plurality of times a first quantum program, the first job request further comprising an instruction to output one or more first partial data results after one or more executions of said quantum program; execute the first job request; and send to the requesting entity the one or more first partial data results of the executed first job request corresponding to the one or more executions of the first quantum program.

20 Claims, 2 Drawing Sheets

QUANTUM DATA RESULT STREAMING

BACKGROUND

The currently claimed embodiments of the present invention relate to quantum computation, and more specifically, to a system and method of quantum data result streaming.

Quantum programming is the process of assembling sequences of instructions or quantum programs that are capable of running on a quantum computer. When a conventional quantum program is executed, a result is produced by the quantum computer. The quantum program can be relatively large and having many circuits that work independently. As a result, the time it takes to execute or run the conventional quantum program in the quantum computer and produce or obtain the result from the computer can be relatively high.

SUMMARY

An aspect of the present invention is to provide a quantum computer system for streaming data results. The quantum computer system is configured to: receive a first job request from a requesting entity, the first job request comprising instructions to execute a plurality of times a first quantum program, the first job request further comprising an instruction to output one or more first partial data results after one or more executions of the quantum program; execute the first job request; and send to the requesting entity the one or more first partial data results of the executed first job request corresponding to the one or more executions of the first quantum program.

Another aspect of the present invention is to provide a method of streaming data results from a quantum computer. The method includes receiving by the quantum computer a first job request from a requesting entity, the first job request comprising instructions to execute a plurality of times a first quantum program on the quantum computer, the first job request further comprising an instruction to the quantum computer to output one or more first partial data results after one or more executions of the quantum program; executing by the quantum computer the first job request; and sending by the quantum computer to the requesting entity the one or more first partial data results of the executed first job request corresponding to the one or more executions of the first quantum program.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
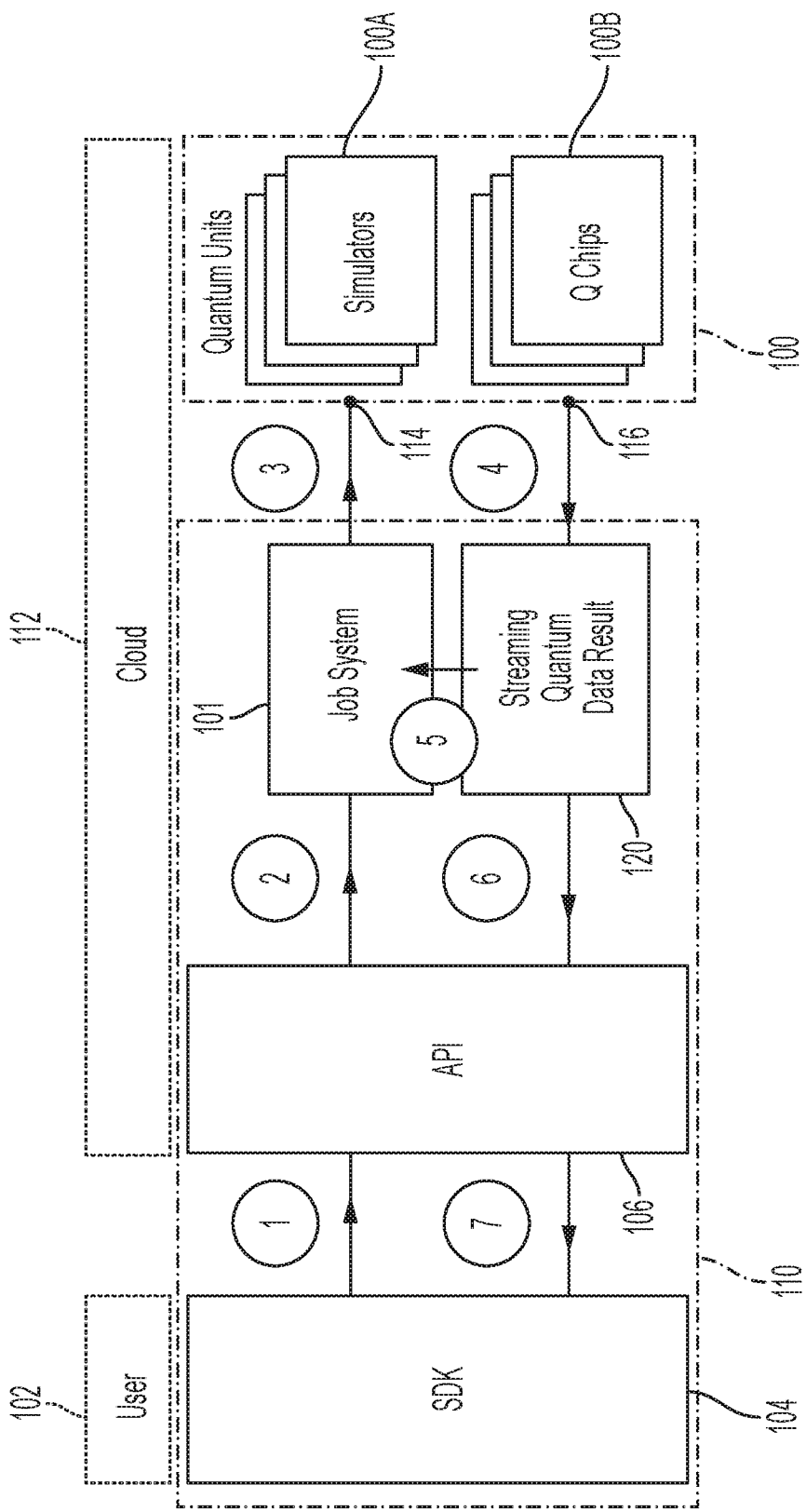
FIG. 1 is a schematic diagram of a process of streaming data results from a quantum computer system, according to an embodiment of the present invention.

FIG. 1 is a schematic diagram of a process of streaming data results from a quantum computer system 100, according to an embodiment of the present invention. The quantum computer system 100 is configured to receive a first job request 101 from a requesting entity 102. In an embodiment, the requesting entity 102 can be a user, as illustrated in FIG. 1. However, the requesting entity 102 can also be a service, i.e., a software as a service (SaaS), accessed over the internet or "cloud", for example.

The requesting entity 102 (e.g., the user) may for example create, manipulate or run a program using a Software Development Kit (SDK) 104. SDK 104 is typically a set of software development tools that allows the creation of applications for a software package, software platform, hardware platform, computer system, video game console, operating system, or other software development platform. For example, in the present case, the SDK 104 can include the QISKIT library of programs by International Business Machines Corporation written in PYTHON language by Python Software Foundation, SWIFT language by Apple Inc. or JAVA language by Oracle America, Inc. QISKIT is an open-source framework for quantum computing developed by International Business Machines Corporation. QISKIT provides tools for creating and manipulating quantum computer programs and running the programs on quantum devices and simulators. The requesting entity 102 can use the SDK (e.g., QISKIT library in Python), as shown by arrow "1" in FIG. 1 to create a program or job request 101 with an Application Program Interface (API) 106, as shown by arrow "2" in FIG. 1. API 106 is a set of functions and procedures allowing the creation of applications that access the features or data of an operating system, application, or other service. Although QISKIT is used herein as an example of a SDK tool to create quantum computer programs or job requests, tools for creating quantum computer programs are not limited to QISKIT as other SDKs exist such as FOREST from Rigetti & Co, Inc. and its Python-based PYQUIL library or other SDKs that may be developed in the future that allow the generation of quantum computer programs.

For example, the requesting entity 102 may use the Application Program Interface (API) 106 along with the SDK 104 (e.g., QISKIT) to interact with a classical computer 110 such as a personal computer, a supercomputer, a server computer, a tablet, or any other handheld device including a smartphone to create, manipulate, change or run a quantum computer program or job request 101. In an embodiment, the SDK 104 (e.g., QISKIT) may be installed on the conventional computer 110 for implementing a quantum computer program or job request 101 in a Python language environment, for example. In an embodiment, the conventional computer 110 can be a personal computer associated with the requesting entity 102 such as a desktop computer, laptop computer, tablet, smartphone, or the like. In another embodiment, the conventional computer 110 can also be implemented as a "cloud" computing service 112 in which case the SDK 104 (e.g., QISKIT under Python, for example) is implemented or housed on one or more servers remote from the requesting entity 102.

The term "job" or "job request" is often used in the computing art to mean a unit of work or unit of execution of one or more software programs. A component of a job or job request is identified as a task. Job request 101 can include one or more command lines to be executed by a computer, for example by quantum computer system 100. For example, the command lines can include instructions to execute one or more quantum computer programs which may be included within the job request 101 or may be called upon as being part of an already existing quantum computing library of programs, or both. The job request 101 may also include other instructions such as instructions to output and read data, etc.

In an embodiment, the job request 101 may be stored in a computer program product which include a computer readable medium or storage medium or media. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. In another embodiment, the job request 101 can be downloaded from a remote conventional computer or server via a network such as the internet, an ATM network, a wide area network (WAN) or a local area network. In yet another embodiment, the job request 101 can reside in the "cloud" 112 on a server platform, for example. In some embodiments, the job request 101 can be embodied as program products in the conventional or classic computer 110 such as a personal computer or server or in a distributed computing environment comprising a plurality of computers 110 that interacts with the quantum computer system 100 by sending instructions to and receiving data from the quantum computer system 100.

Generally, the classical or conventional computer 110 provides inputs, as depicted by arrow "3" in FIG. 1 and receives outputs, as depicted by arrow "4" in FIG. 1 from the quantum computer system 100. The inputs (shown as arrow "3") may include instructions included as part of the job request 101. The outputs (shown as arrow "4") may include quantum data results of a computation of the job request 101 on the quantum computer system 100.

The classical computer 110 interfaces with the quantum computer system 100 via quantum computer input 114 and quantum computer output 116. The classical computer 110 sends commands or instructions included within the job request 101 to the quantum computer system 100 via input 114 and the quantum computer system 100 returns outputs of a quantum computation of programs with the job request 101 to the classical computer 110 via output 116. The classical computer 110 can communicate with the quantum computer system 100 wirelessly or via the internet. In an embodiment, the quantum computer system 100 can be a quantum computing simulator 100A simulated on a classical computer. For example, the quantum computer system 100 simulating the quantum computing simulator 100A can be one and the same as the classical computer 110. In another embodiment, the quantum computer system 100 is a superconducting quantum computer 100B. In an embodiment, the superconducting quantum computer 100B comprises one or more quantum circuits (Q Chips), each quantum circuit comprises one or more qubits and one or more quantum gates.

In an embodiment, in the case where the quantum computer system 100 is a superconducting computer, the input 114 and output 116 (interface between the classic computer 110 the quantum computer system 100) operate as digital to analog converters (DAC), and analog to digital converters (ADC). In an embodiment, the inputs and outputs (interface) 114 and 116 can be configured to minimize environmental effects on the quantum computer system 100. For example, the input 114 and output 116 can be configured to isolate the quantum computer system 100 from noise, temperature variation, undesirable signal couplings and other effects. The input 114 and output 116 can be configured to operate as serial or as parallel communication channels. The input 114 and output 116 can include semiconductor circuits, superconductor circuits, optical devices and channels, digital circuits, and analog circuits, etc.

In an embodiment, it is beneficial to provide a quantum data result streaming that sends to the requesting entity 102 (e.g., the user) quantum circuits execution partial quantum data results in a continuous stream of data. For example, the partial quantum data results can be streamed to the requesting entity as soon as the quantum partial data are obtained. In this way, the requesting entity 102 (e.g., user) does not need to wait until the quantum computer system 100 finishes the execution of the quantum program or the job request 101 completely. Instead, the quantum computer can be configured or programmed to return partial data results to notify the requesting entity 102 of the data results of the quantum program as the quantum program in the job request 101 is being executed, for example in real time.

In an embodiment, the requesting entity 102 (the user or a service), sends a job request 101 including a quantum program (one or more quantum programs) to be executed. The job request 101 enters in a job system which sends to execute the quantum program in the quantum computer system 100 (e.g., one or more quantum computers). When the quantum computer system 100 executes the instructions in the job request 101, the quantum computer system 100 sends to the classic computer 110 one or more partial data results, in a mode of streaming service 120, for example. The streaming partial quantum data result is transmitted back to the API 106, as shown by arrow "6" in FIG. 1, which outputs the data results via the SDK 104 (e.g., QISKIT), as shown by arrow "7" in FIG. 1, for evaluation by the requesting entity 102.

The requesting entity 102 evaluates the one or more partial data results 120 and based on the one or more partial data results 120, the requesting entity 102 makes a decision, as shown by arrow "5" in FIG. 1, to pause the execution of the quantum program, halt the execution of the quantum program, change the quantum program (for example by replacing some quantum circuits in the quantum program), cancel the quantum program, or wait for more quantum data results. In an embodiment, for example, the job request 101 in the job system can be modified or changed by the requesting entity 102 based on the stream of partial quantum data result 120.

Therefore, as it can be appreciated from the above paragraphs, in some embodiments, the job request 101 comprises instructions to execute a plurality of times a first quantum program. The first job request 101 also includes an instruction to output one or more first partial data results after one or more executions of the quantum program. The quantum computer system 100 is further configured to execute the first job request. The quantum computer system 100 is also configured to send to the requesting entity 102 the one or more first partial data results of the executed first job request 101 corresponding to the one or more executions of the first quantum program.

In an embodiment, the quantum computer system 100 can be configured to receive from the requesting entity 102 an instruction to halt executing the first job request 101 if the requesting entity 102 determines that the one or more first partial data results 120 is not as expected. In another embodiment, the quantum computer system 100 can be configured to receive from the requesting entity 102 an instruction to halt executing the first job request 101 if the requesting entity 102 determines that the one or more first partial data results 120 are sufficient to understand an outcome of the first job request 101 without further quantum data results needed.

In an embodiment, the quantum computer system 100 can be configured to receive from the requesting entity 102 an instruction to continue executing the first job request 101 if the requesting entity 102 determines that the one or more first partial data results 120 is as expected. In an embodiment, the quantum computer system 100 can be configured to receive from the requesting entity 102 a second job request, the second job request modifying the first job request 101 based on the one or more first partial data results 120. The second job request can include instructions to execute a plurality of times a second quantum program on the quantum computer 100, execute the second job request, and send to the requesting entity 102 the one or more second partial data results of the executed second job request corresponding to the one or more executions of the second quantum program. In an embodiment, the quantum computer system 100 can be configured to send to the requesting entity 102 the one or more first partial data results at selected time intervals.

Figure 2:
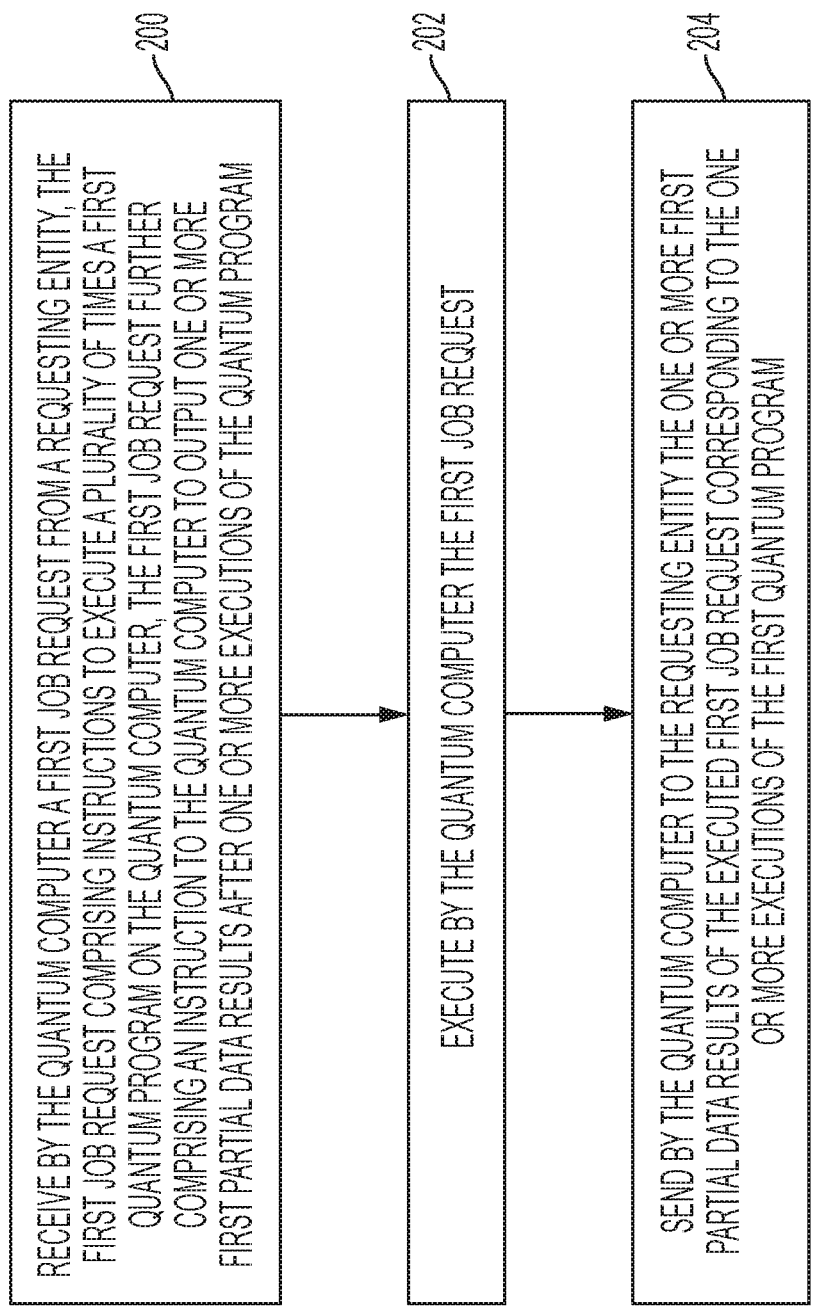
FIG. 2 is a flow chart of a method of streaming data results from a quantum computer, according to an embodiment of the present invention.

As it can be appreciated from the above paragraphs, in some embodiments, there is also provided a method of streaming data results from a quantum computer (e.g., quantum computer system 100). FIG. 2 is a flow chart diagram of the method of streaming data results from a quantum computer, according to an embodiment of the present invention. The method includes receiving by the quantum computer a first job request from a requesting entity, the first job request comprising instructions to execute a plurality of times a first quantum program on the quantum computer, the first job request further comprising an instruction to the quantum computer to output one or more first partial data results after one or more executions of the quantum program, at 200. The method further includes executing by the quantum computer the first job request, at 202. The method also includes sending by the quantum computer to the requesting entity the one or more first partial data results of the executed first job request corresponding to the one or more executions of the first quantum program, 204.

In an embodiment, the method further includes receiving by the quantum computer from the requesting entity an instruction to halt executing the first job request if the requesting entity determines that the one or more first partial data results is not as expected. In another embodiment, the method further includes receiving by the quantum computer from the requesting entity an instruction to halt executing the first job request if the requesting entity determines that the one or more first partial data results are sufficient to understand an outcome of the first job request without further quantum data results needed.

In an embodiment, the method includes receiving by the quantum computer from the requesting entity an instruction to continue executing the first job request if the requesting entity determines that the one or more first partial data results is as expected. In an embodiment, the method further includes receiving by the quantum computer from the requesting entity a second job request, the second job request modifies the first job request based on the one or more first partial data results, the second job request comprising instructions to execute a plurality of times a second quantum program on the quantum computer; executing by the quantum computer the second job request; and sending by the quantum computer to the requesting entity the one or more second partial data results of the executed second job request corresponding to the one or more executions of the second quantum program. In an embodiment, sending by the quantum computer to the requesting entity the one or more first partial data results of the executed first job request corresponding to the one or more executions of the first quantum program includes sending by the quantum computer to the requesting entity the one or more first partial data results at selected time intervals. In an embodiment, the requesting entity is a user or a service.

In an embodiment, the quantum program includes one or more quantum circuits, each quantum circuit includes one or more qubits and one or more quantum gates. In an embodiment, the quantum computer is a quantum computing simulator simulated on a classical computer or a superconducting quantum computer.

In the following paragraphs, an example of QISKIT computer program or computer code and an example of a job request are provided herein to illustrate the operation of the method and the quantum computer system implementing the method. The following lines of code are one example of a QISKIT quantum computer program:

```
from QISKIT import QuantumCircuit, QuantumRegister,
    ClassicalRegister
from QISKIT import IBMQ, execute
backend='ibmq_5_tenerife'
backend=IBMQ.get_backend(backend)
qr=QuantumRegister(2, 'qr')
cr=ClassicalRegister(2, 'cr')
qc=QuantumCircuit(qr, cr, name='my_example')
qc.h(qr[0])
qc.measure(qr[0], cr[0])
qc.measure(qr[1], cr[1])
job=execute(qc, backend=backend)
result=job.result( )
```

The following lines are an example of a job request that instructs the quantum computer to execute the above QISKIT quantum computer code or program:

{"qobj_id": "ID", "confg": {"shots": 1024, "memory_slots": 2, "max_credits": 10, "memory": false, "n_qubits": 5}, "experiments": [{"instructions": [{"name": "u2", "params": [0, 3.141592653589793], "texparams": ["0", "\\pi"], "qubits": [0], "memory": [ ]}, {"name": "barrier", "params": [ ], "texparams": [ ], "qubits": [0, 1], "memory": [ ]}, {"name": "measure", "params": [ ], "texparams": [ ], "qubits": [0], "memory": [0]}, {"name": "measure", "params": [ ], "texparams": [ ], "qubits": [1], "memory": [1]}], "header": {"n_qubits": 20, "memory_slots": 2, "qubit_labels": [["q", 0], ["q", 1], ["q", 2], ["q", 3], ["q", 4]], "clbit_labels": [["cr", 0], ["cr", 1]], "qreg_sizes": [["q", 5]], "creg_sizes": [["cr", 2]], "name": "my_example", "compiled_circuit_qasm": "OPENQASM 2.0; \ninclude \"qelib1.inc\"; \nqreg q[5]; \ncreg cr[2]; \nu2(0,pi) q[0]; \nbarrier q[0], q[1]; \nmeasure q[1]→cr[1]; \nmeasure q[0]→cr[0]; \n"}, "confg": {"memory_slots": 2, "n_qubits": 5}}], "header": {"backend_name": "ibmq_5_tenerife"}, "type": "QASM", "schema_version": "1.0.0"}

For example, the above job request instructs the quantum computer to run 1024 shots. The term "shot" or "shots" corresponds to the number of times the quantum program above in the job request is executed in the quantum computer to output a quantum data result. In an embodiment, the quantum data result can be in the form "data": ("counts": {"0x0": 241, "0x1": 258, "0x2": 261, "0x3": 264}}. The quantum data result provides the statistical outcome for 2 qubits. The quantum data result shows that both qubits are in the state "0" 241 times out of 1024 shots, qubit 0 is in the state "1" and qubit 1 in the state "0" 258 times out of 1024 shots, qubit 0 is in the state "0" and qubit 1 in the state "1" 261 times out of 1024 shots, and both qubits are in the state "1" 264 times out of 1024 shots. The sum of all the counts 241+258+261+264 is equal to the total number of shots 1024.

In this example, the program instructs the quantum computer to count the number of times the qubits are in a particular state (the state being the binary number representing whether each qubit is in the state "0" or "1"). In this example, the job request includes an instruction to run 1024 shots (i.e., the quantum program in the job request is run 1024 times). However, according to some embodiments of the present invention, the job request can include an instruction to the quantum computer to output one or more partial quantum data results after one, two or more shots (i.e., one, two or more execution of the above quantum program). For example, the job request can include an instruction or "flag" for the quantum computer to output quantum data results after 1 shot, after 10 shots, after 100 shots or any number of shots. Depending on the statistical counts for the different qubits, the requesting entity (e.g., the user or a service) can determine whether the partial quantum data results are not as expected or whether the partial quantum data results are sufficient to understand an outcome of the job request without further quantum data results needed, in which case the execution of the job request can be halted. In addition, the requesting entity can also pause the execution of the job request or quantum program, halt the execution of the quantum program, change the quantum program (for example by replacing some quantum circuits in the quantum program), cancel the quantum program, or wait for more data results if the partial quantum data results are found by the requesting entity to be not within expected ranges.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A quantum computer system for streaming data results, the quantum computer system configured to:
   receive a first job request from a requesting entity, the first job request comprising instructions to execute a plurality of times a first quantum program, the first job request further comprising an instruction to output one or more first partial data results prior to execution of said first quantum program all of said plurality of times to provide said streaming of data results;
   execute the first job request; and
   send to the requesting entity the one or more first partial data results during execution of the first job request.

2. The quantum computer system according to claim 1, wherein the quantum computer system is further configured to receive from the requesting entity an instruction to halt executing the first job request if the requesting entity determines that the one or more first partial data results is not as expected.

3. The quantum computer system according to claim 2, wherein the quantum computer system is further configured to receive from the requesting entity an instruction to continue executing the first job request if the requesting entity determines that the one or more first partial data results is as expected.

4. The quantum computer system according to claim 2, wherein the quantum computer system is further configured to receive from the requesting entity a second job request, the second job request modifying said first job request based on the one or more first partial data results, the second job request comprising instructions to execute a plurality of times a second quantum program on the quantum computer; execute the second job request; and send to the requesting entity the one or more second partial data results of the executed second job request.

5. The quantum computer system according to claim 1, wherein the quantum computer system is further configured to receive from the requesting entity an instruction to halt executing the first job request if the requesting entity determines that the one or more first partial data results are sufficient to understand an outcome of the first job request without further data needed.

6. The quantum computer system according to claim 1, wherein the quantum computer system is further configured to send to the requesting entity the one or more first partial data results at selected time intervals.

7. The quantum computer system according to claim 1, wherein the requesting entity is a user or a service.

8. The quantum computer system according to claim 1, wherein the quantum program comprises one or more quantum circuits, each quantum circuit comprising one or more qubits and one or more quantum gates.

9. The quantum computer system according to claim 1, wherein the quantum computer is a quantum computing simulator simulated on a classical computer.

10. The quantum computer system according to claim 1, wherein the quantum computer is a superconducting quantum computer.

11. A method of streaming data results from a quantum computer comprising:
    receiving by the quantum computer a first job request from a requesting entity, the first job request comprising instructions to execute a plurality of times a first quantum program on the quantum computer, the first job request further comprising an instruction to the quantum computer to output one or more first partial data results prior to execution of said quantum program all of said plurality of times to provide said streaming of said data results;
    executing by the quantum computer the first job request; and
    sending by the quantum computer to the requesting entity the one or more first partial data results during execution of the first job request.

12. The method according to claim 11, further comprising:
    receiving by the quantum computer from the requesting entity an instruction to halt executing the first job request if the requesting entity determines that the one or more first partial data results is not as expected.

13. The method according to claim 12, further comprising:
receiving by the quantum computer from the requesting entity an instruction to continue executing the first job request if the requesting entity determines that the one or more first partial data results is as expected.

14. The method according to claim 11, further comprising:
receiving by the quantum computer from the requesting entity a second job request, the second job request modifies said first job request based on the one or more first partial data results, the second job request comprising instructions to execute a plurality of times a second quantum program on the quantum computer;
executing by the quantum computer the second job request; and
sending by the quantum computer to the requesting entity the one or more second partial data results of the executed second job request corresponding to the one or more executions of the second quantum program.

15. The method according to claim 11, further comprising receiving by the quantum computer from the requesting entity an instruction to halt executing the first job request if the requesting entity determines that the one or more first partial data results are sufficient to understand an outcome of the first job request without further data needed.

16. The method according to claim 11, wherein sending by the quantum computer to the requesting entity the one or more first partial data results of the executed first job request corresponding to the one or more executions of the first quantum program comprises sending by the quantum computer to the requesting entity the one or more first partial data results at selected time intervals.

17. The method according to claim 11, wherein the quantum program comprises one or more quantum circuits, each quantum circuit comprising one or more qubits and one or more quantum gates.

18. The method according to claim 11, wherein the quantum computer is a quantum computing simulator simulated on a classical computer.

19. The method according to claim 11, wherein the quantum computer is a superconducting quantum computer.

20. A computer readable medium on which is stored non-transitory computer-executable code, which when executed by a quantum computer causes the quantum computer to:
receive a first job request from a requesting entity, the first job request comprising instructions to execute a plurality of times a first quantum program on the quantum computer, the first job request further comprising an instruction to the quantum computer to output one or more first partial data results prior to execution of said first quantum program all of said plurality of times to provide said streaming of data results;
execute the first job request; and
send to the requesting entity the one or more first partial data results during execution of the first job request.

* * * * *